(12) United States Patent
Kim

(10) Patent No.: US 11,923,757 B2
(45) Date of Patent: Mar. 5, 2024

(54) ELECTRONIC DEVICE FOR CUTTING OFF POWER

(71) Applicant: Changho Kim, Anyang-si (KR)

(72) Inventor: Changho Kim, Anyang-si (KR)

( * ) Notice: Subject to any disclaimer, the term of this patent is extended or adjusted under 35 U.S.C. 154(b) by 302 days.

(21) Appl. No.: 17/609,881

(22) PCT Filed: May 8, 2020

(86) PCT No.: PCT/KR2020/006092
§ 371 (c)(1),
(2) Date: Nov. 9, 2021

(87) PCT Pub. No.: WO2020/226452
PCT Pub. Date: Nov. 12, 2020

(65) Prior Publication Data
US 2022/0216780 A1    Jul. 7, 2022

(30) Foreign Application Priority Data

May 9, 2019   (KR) .................. 10-2019-0054029
Mar. 31, 2020  (KR) .................. 10-2020-0038895

(51) Int. Cl.
*H02M 1/00*    (2006.01)
*H02J 9/00*    (2006.01)
(Continued)

(52) U.S. Cl.
CPC ............. *H02M 1/0032* (2021.05); *H02J 9/00* (2013.01); *H02M 1/0048* (2021.05); *H02M 1/08* (2013.01);
(Continued)

(58) Field of Classification Search
CPC ............. H02M 1/0003; H02M 1/0006; H02M 1/0032; H02M 1/0048; H02M 1/0054;
(Continued)

(56) References Cited

U.S. PATENT DOCUMENTS 9,761,130 B2 * 9/2017 Kim .......................... H02J 3/00
10,063,091 B2 * 8/2018 Jeong ................. H04N 21/4436
(Continued)

FOREIGN PATENT DOCUMENTS

JP      2014-13698 A    1/2014
KR      10-1043310 B1   6/2011
(Continued)

OTHER PUBLICATIONS

International Search Report dated Sep. 1, 2020, issued in counterpart International Application No. PCT/KR2020/006092. (2 pages).

*Primary Examiner* — Thienvu V Tran
*Assistant Examiner* — Shahzeb K Ahmad
(74) *Attorney, Agent, or Firm* — WHDA, LLP

(57) ABSTRACT

An electronic device according to various embodiments may comprise a power converter configured to generate DC(direct current) power based on power obtained from outside, a state detecting unit, comprising a first photo coupler and a first diode electrically connected with the first photo coupler, configured to detect a state of a user device that comprises the electronic device or is electrically connected with the electronic device, a driving power supply unit configured to supply driving power for the user device based on the DC power, a power cut-off unit, comprising a first field effect transistor (FET), configured to cut off the DC power provided to the driving power supply unit according to the state of the user device, a control unit electrically connected with the state detecting unit.

15 Claims, 3 Drawing Sheets

(51) Int. Cl.
*H02M 1/08* (2006.01)
*H02M 3/155* (2006.01)
*H02M 7/06* (2006.01)
*H02M 1/32* (2007.01)

(52) U.S. Cl.
CPC ............ *H02M 3/155* (2013.01); *H02M 7/06* (2013.01); *H02M 1/0054* (2021.05); *H02M 1/327* (2021.05)

(58) Field of Classification Search
CPC .......... H02M 1/08; H02M 1/32; H02M 1/327; H02M 1/36; H02M 3/155; H02M 3/156; H02M 7/06; H02M 7/155; H02M 7/1555; H02M 7/162; H02M 7/1623; H02H 3/06; H02H 3/07; H02J 9/00
See application file for complete search history.

(56) References Cited

U.S. PATENT DOCUMENTS

2004/0032754 A1* 2/2004 Yang .................. H02M 1/36
    363/56.09
2014/0341603 A1* 11/2014 Fujiwara ............ H02M 1/081
    399/88
2018/0269794 A1* 9/2018 Arimoto ............... H02M 1/08
2018/0358893 A1* 12/2018 Yamabe ........... H02M 3/33523

FOREIGN PATENT DOCUMENTS

| KR | 10-2013-0121046 A | 11/2013 | |
|---|---|---|---|
| KR | 10-1411433 B1 | 6/2014 | |
| KR | 10-2016-0013628 A | 2/2016 | |
| KR | 101671482 B1 * | 11/2016 | ............ H02J 13/00 |

* cited by examiner

ELECTRONIC DEVICE FOR CUTTING OFF POWER

TECHNICAL FIELD

Various embodiments relate to an electronic device for cutting off power.

BACKGROUND ART

Apparent power includes reactive power as well as active power. The reactive power may be generated according to the characteristics of the load. For example, reactive power may be stored in a coil of a transformer for changing a high voltage to a low voltage, or may be stored in a coil of a motor for changing electrical energy to rotational energy.

DISCLOSURE

Technical Problem

As a means for reducing energy waste, a user device limits standby power consumed by the user device to a designated level or less. For example, when the power of the user device is turned off, the user device reduces the standby power to 1(W) or less by switching the mode of the switch element of the user device to a burst mode. However, since the burst mode is a mode in which more electric current is applied to the capacitor and the coil constituting the EMI filter of the power supply in the user equipment, it causes an increase in reactive power as a trade-off for the reduction of the standby power. In other words, due to the increase in the consumption of reactive power, the consumption of wasted power of the user device using the burst mode may increase.

The technical problems to be achieved in this document are not limited to those described above, and other technical problems not mentioned herein will be clearly understood by those having ordinary knowledge in the art to which the present disclosure belongs, from the following description.

Technical Solution

An electronic device according to various embodiments may comprise a power converter configured to generate DC(direct current) power based on power obtained from outside, a state detecting unit, comprising a first photo coupler and a first diode electrically connected with the first photo coupler, configured to detect a state of a user device that comprises the electronic device or is electrically connected with the electronic device, a driving power supply unit configured to supply driving power for the user device based on the DC power, a power cut-off unit, comprising a first field effect transistor (FET), configured to cut off the DC power provided to the driving power supply unit according to the state of the user device, a control unit electrically connected with the state detecting unit; wherein the control unit is configured to in response to detecting, by the state detecting unit, the state of the user device is switched from a first designated state requiring application of the driving power to a second designated state requiring cut-off of the driving power, switch a state of a first signal from a first state to a second state to turn off a light emitting diode (LED) of the first photo coupler; wherein a transistor of the first photo coupler is turned off based on turning off the LED of the first photo coupler; wherein an anode and a cathode of first diode is changed to a low state based on the turning-off of the transistor of the first photo coupler; wherein the first FET of the power cut-off unit is turned off by changing a state of a gate of the first FET to a low state by changing the cathode of the first diode connected with the gate of the first FET to the low state; wherein the power cut-off unit is configured to cut off the DC power provided to the driving power supply unit based on the turning-off of the first FET.

Advantageous Effects

The electronic device according to various embodiments can reduce wasted power caused by the user device by cutting off DC power using a field effect transistor (FET) and a diode electrically connected to a gate of the FET while a user device including the electronic device or electrically connected to the electronic device is turned off.

The effects that can be obtained from the present disclosure are not limited to those described above, and any other effects not mentioned herein will be clearly understood by those having ordinary knowledge in the art to which the present disclosure belongs, from the following description.

MODE FOR INVENTION

Figure 1:
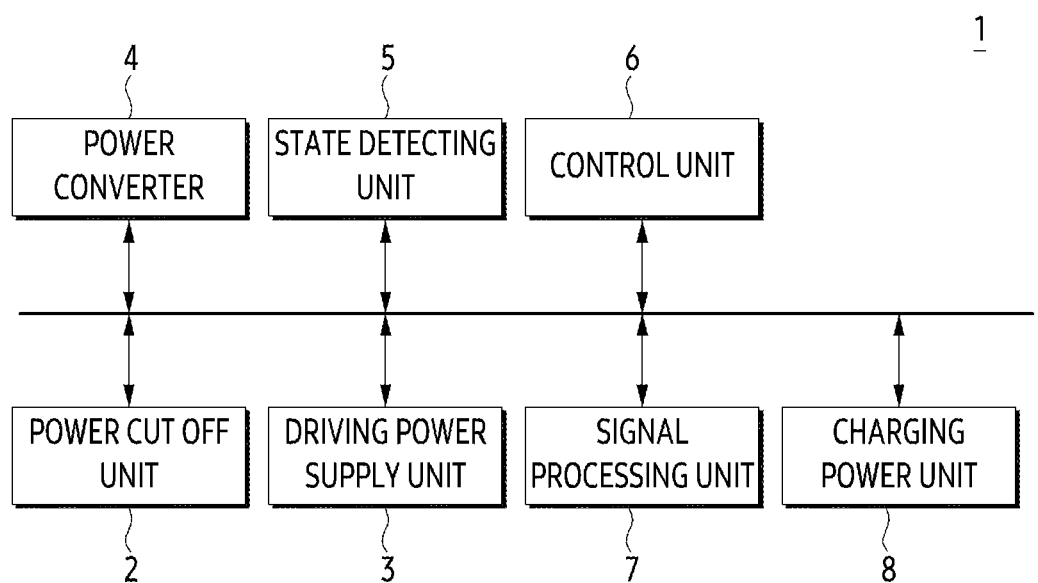
FIG. 1 is a simplified block diagram of an electronic device according to various embodiments.

The various embodiments of this document and the terms used herein are not intended to limit the technology described in this document to a specific embodiment, should be understood to include various modifications, equivalents, and/or substitutions of the embodiments. With respect to the description of the drawings, similar reference numerals may be used for similar components. The singular expression may include the plural expression unless the context clearly dictates otherwise. In this document, expressions such as "A or B", "at least one of A and/or B", "A, B or C", or "at least one of A, B and/or C" may include all possible combinations of items listed together. Expressions such as "first", "second", "first", or "second" may modify the corresponding components regardless of order or importance, and only use to distinguish one component from another component and do not limit the corresponding components. When some (e.g., first) component is referred to as "functionally or communicatively connected" or "accessed" to another (e.g., second) component, some of the components may be directly connected to the other components or may be connected through other components (e.g., a third component).

FIG. 1 is a simplified block diagram of an electronic device according to various embodiments.

Figure 2:
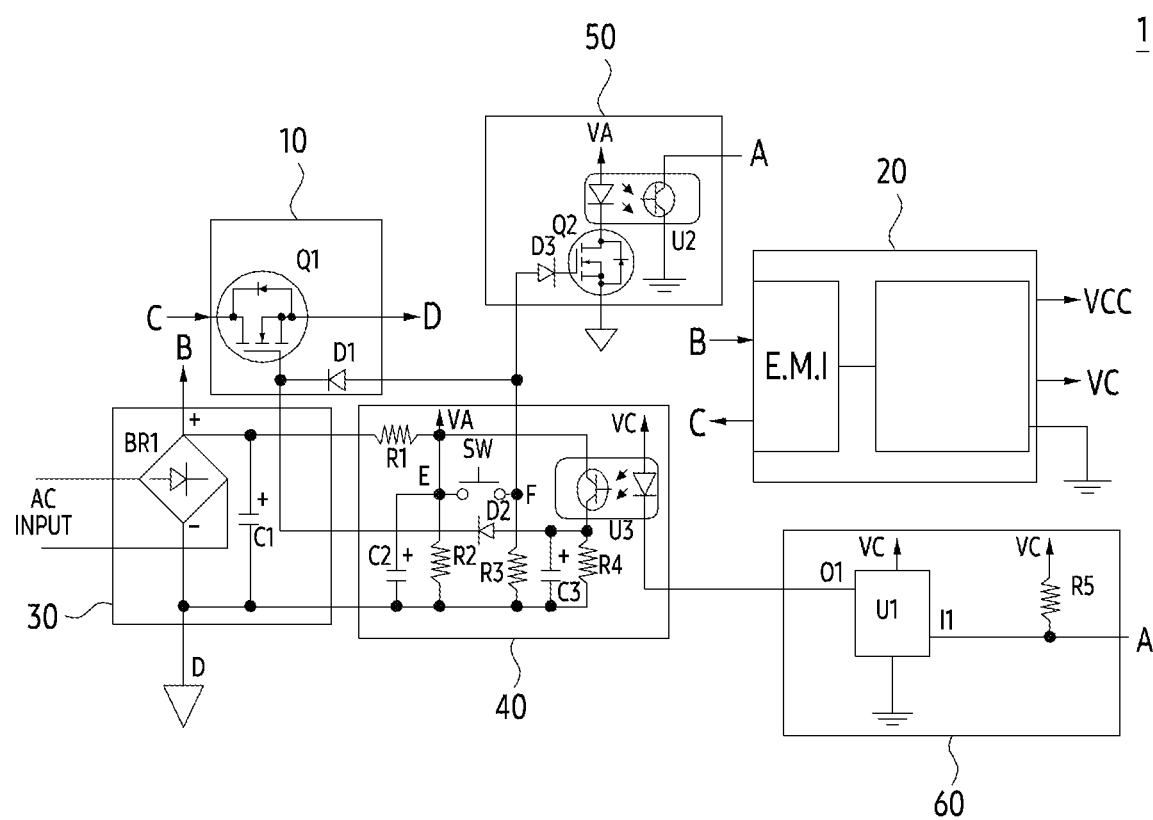
FIG. 2 illustrates an example of a circuit of an electronic device according to various embodiments.

FIG. 2 illustrates an example of a circuit of an electronic device according to various embodiments.

Figure 3:
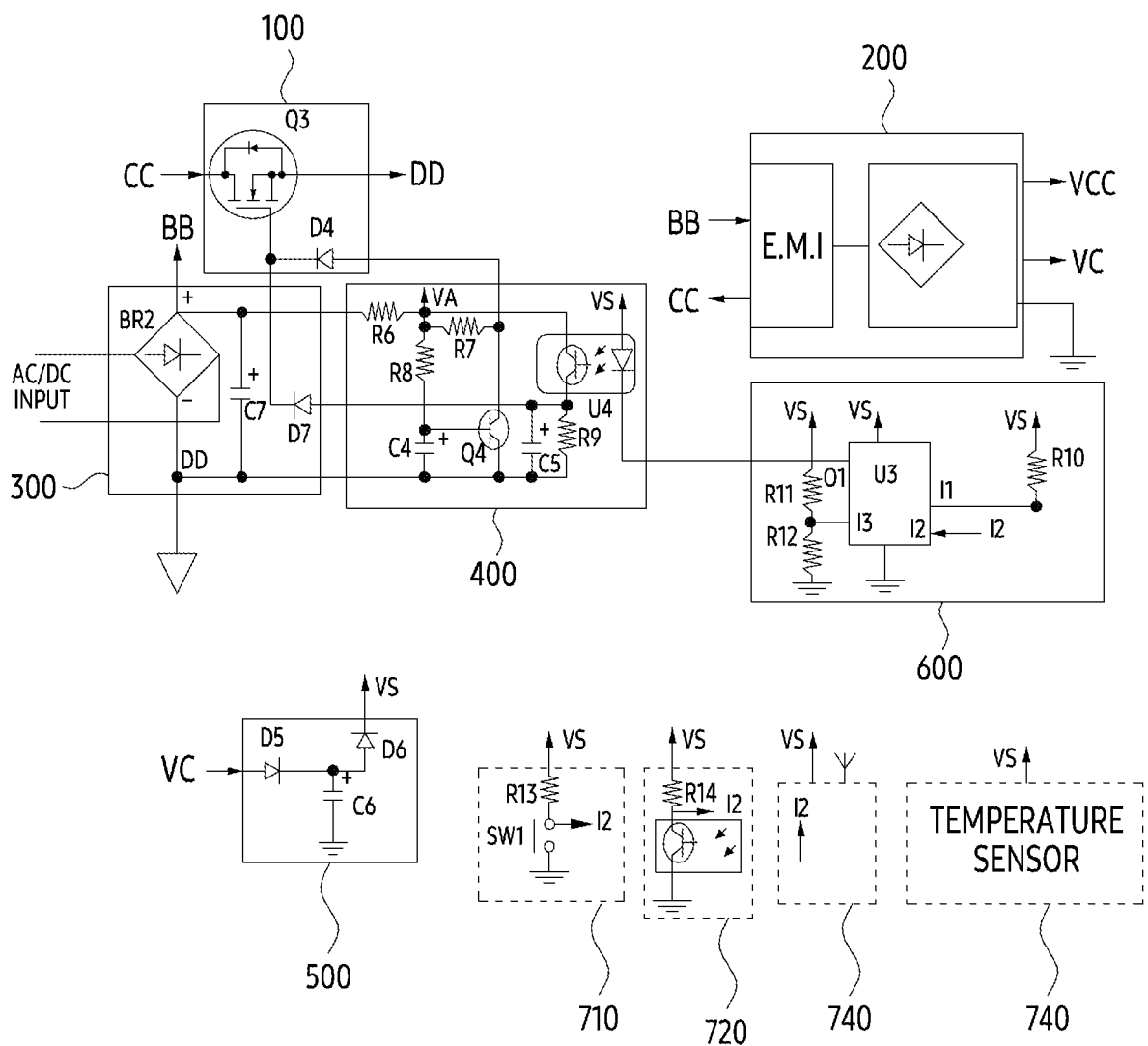
FIG. 3 illustrates another example of a circuit of an electronic device according to various embodiments.

FIG. 3 illustrates another example of a circuit of an electronic device according to various embodiments.

Referring to FIG. 1, in various embodiments, the electronic device 1 may include a power cut-off unit 2, a driving power supply unit 3, a power converter 4, a state detecting unit 5, and a control unit 6. According to embodiments, the electronic device 1 may further include at least one of a signal processing unit 7 or a charging power unit 8.

In various embodiments, the power cut-off unit 2 may be used to cut off DC power provided to the driving power supply unit 3 according to the state of the user device (not shown in FIG. 1, for example; laptop computer, smartphone, refrigerator, desktop computer, Internet of things (IoT) device, multi-tap (or extension code), washing machine, etc.) including the electronic device 1 or electrically connected to the electronic device 1. For example, the power cut-off unit 2 may include a diode; electrically connected to a first field effect transistor (FET) and a gate of the first FET to cut off the DC power.

In various embodiments, the driving power supply unit 3 may be used to supply driving power for the user device based on the DC power obtained by the power converter 4. For example, the driving power supply unit 3 may include an electro-magnetic interference (EMI) filter, a switching unit, and an output unit to supply the driving power to at least one load of the user device. For example, the driving power supply unit 3 may include a switching mode power supply (SMPS).

In various embodiments, the power converter 4 may be used to generate DC power based on power obtained from the outside. In an embodiment, the power converter 4 may convert AC power obtained from the outside into DC power. For example, the power converter 4 may include a bridge diode (or a diode bridge) and a capacitor to convert the AC power to the DC power. However, it is not limited thereto. In another embodiment, the power converter 4 may generate the DC power based on the DC power applied to the power converter 4. However, it is not limited thereto.

In various embodiments, state detecting unit 5 may be used to detect the state of the user device. For example, the state detecting unit 5 may detect whether the state of the user device is within a first designated state requiring application of driving power for the user device or a second designated state requiring blocking of the driving power. For example, the state detection unit 5 may include at least one of a switch exposed through at least a portion of the housing of the user device, an infrared (IR) signal receiving module capable of receiving an IR signal, a radio frequency (RF) signal receiving module capable of receiving RF signal, a temperature sensor or a humidity sensor to detect whether the state of the user device is within the first designated state or within the second designated state. According to embodiments, various sensors as well as a temperature sensor and a humidity sensor may be included in the state detecting unit 5.

In various embodiments, the state detecting unit 5 may include devices for turning on or off the first FET included in the power cut-off unit 2. For example, the state detecting unit 5 may include a first photo coupler and a diode electrically connected to the first photo coupler. In various embodiments, the first photo coupler may include a light emitting diode (LED) and a transistor. In some embodiments, the first photo coupler and the diode may be included in the power cut-off unit 2 or the control unit 6, not in the state detecting unit 5. However, it is not limited thereto.

In various embodiments, the control unit 6 may control whether the power cut-off unit 2 cuts off the DC power provided to the driving power supply unit 3. For example, the control unit 6 may adaptively switch the state of the signal transmitted from the control unit 6 to the state detecting unit 5 according to the state of the user device detected by the state detecting unit 5. For example, the control unit 6 may include a microprocessor computer (MICOM) including at least one input terminal and at least one output terminal for adaptive switching of the state of the signal.

In various embodiments, the signal processing unit 7 may be used to receives a signal from the state detecting unit 5 to indicate whether the state of the user device is within the first designated state or within the second designated state and switch the state of the signal transmitted from the signal processing unit 7 to the control unit 6 based on the received signal. For example, to switch the state of the signal, the signal processing unit 7 may include a second FET, a diode electrically connected to the state detecting unit 5 and electrically connected to a gate of the second FET, and a second photo coupler electrically connected to a drain of the second FET. In various embodiments, the second photo coupler may include an LED and a transistor.

In various embodiments, the charging power unit 8 may be used to provide power for driving at least one of an IR signal reception module that may be included in the state detecting unit 5, an RF signal reception module capable of receiving a radio frequency (RF) signal, or a temperature sensor, while the user device is in the second designated state and the power cut-off unit 2 cuts off the DC power. In various embodiments, the charging power unit 8 may be used to provide power for driving the control unit 6 in the wake-up state, while the user device is in the second designated state and the power cut-off unit 2 cuts off the DC power. For example, the charging power unit 8 may include diodes and capacitors to provide the power.

In various embodiments, in response to the state detecting unit 5 detecting that the state of the user device is switched from the first designated state to the second designated state, the control unit 6 may switch the state of the first signal transmitted from the control unit 6 to the state detecting unit 5 from the first state to the second state in order to turn off the LED of the first photo coupler in the state detecting unit 5. In various embodiments, the transistor of the first photo coupler may be turned off, based on the turning off the LED of the first photo coupler. In various embodiments, the anode and cathode of the first diode in the state detecting unit 5 electrically connected to the first photo coupler may be changed to a low state based on the turn-off of the transistor of the first photo coupler. In various embodiments, the first FET of the power cut-off unit 2 may be turned off by changing the state of the gate of the first FET to a low state, by changing the cathode of the first diode electrically connected to the gate of the first FET to the low state. In various embodiments, the power cut-off unit 2 may cut off the DC power provided to the driving power supply unit 3 based on the turn-off of the first FET.

In various embodiments, when the signal processing unit 7 is further included in the electronic device 1, the signal processing unit 7 may include a second diode electrically connected to the second FET and the state detecting unit 5 and electrically connected to a gate of the second FET, and a second photo coupler electrically connected to a drain of the second FET.

In various embodiments, the second FET may be turned on in response to receiving a second signal for indicating that the state of the user device is switched from the first designated state to the second designated state using a gate of the second FET, from the state detecting unit 5 through the second diode. In various embodiments, the LED of the second photo coupler may be turned on based on the turn-on of the second FET. In various embodiments, the transistor of the second photo coupler may be turned on based on the turning-on the LED of the second photo coupler. In various embodiments, the state of the third signal transmitted from the signal processing unit 7 to the control unit 6 may be switched from the first state to the second state based on the turn-on of the transistor of the second photo coupler. In various embodiments, the control unit 6 may switch the state of the first signal from the first state to the second state in response to the third signal of the second state switched from the first state.

In various embodiments, the power cut-off unit 2 may further include a third diode connected to the gate of the first FET. In various embodiments, while the user device is in the first designated state, the first FET of the power cut-off unit 2 may be turned on based on a voltage applied to a gate of the first FET through the third diode. In various embodiments, the power cut-off unit 2 may provide the DC power to the driving power supply unit 3 based on the turn-on of the first FET.

In various embodiments, when the state detecting unit 5 includes the IR signal reception module electrically connected to the control unit 6, the state detecting unit 5 may detect whether the state of the user device is within the first designated state or within the second designated state according to whether an IR signal is received through the IR signal reception module. For example, when the state detecting unit 5 includes the IR signal reception module electrically connected to the control unit 6, the charging power unit 8 in the electronic device 1 may include a fourth diode, a capacitor, and a fifth diode. In various embodiments, the anode of the fourth diode may be electrically connected to the driving power supply unit, the cathode of the fourth diode may be electrically connected to a first terminal of the capacitor, and may be electrically connected to an anode of the fifth diode. In various embodiments, the second terminal of the capacitor may be electrically connected to the ground. In various embodiments, the cathode of the third diode may be electrically connected to each of the control unit 6 and the IR signal receiving module. In various embodiments, the capacitor may be charged based on a voltage applied through the fourth diode, while the user device is in the first designated state. In various embodiments, the IR signal receiving module may maintain an active state based on a voltage of the charged capacitor, while the user device is in the second designated state. In various embodiments, in response to a transition from the first designated state to the second designated state of the user device, the control unit 6 may change the state of the control unit 6 to the sleep state, change the sleep state to the wake-up state based on a designated period while the user device is in the second designated state, and identify whether the voltage level of the charged capacitor reaches less than a designated level. In various embodiments, in response to identifying that the level of the voltage of the charged capacitor reaches less than the designated level while the user device is in the second designated state, the control unit 6 may switch the state of the first signal transmitted from the control unit 6 to the state detecting unit 5 from the second state to the first state, in order to maintain the active state of the IR signal receiving module. In various embodiments, the LED of the first photo coupler may be turned on based on the first signal switched to the first state. In various embodiments, the transistor of the first photo coupler may be turned on based on the lighting of the LED of the first photo coupler. In various embodiments, the anode and the cathode of the first diode may be changed to a high state based on the turn-on of the transistor of the first photo coupler. In various embodiments, the first FET of the power cut-off unit 2 may be turned on based on a voltage applied to the gate of the first FET through the third diode in the power cut-off unit 2, in response to the change of the anode and the cathode to the high state of the first diode. In various embodiments, the power cut-off unit 2 may provide the DC power to the driving power supply unit 3 based on the turn-on of the first FET. In various embodiments, the charging power unit 8 may charge the capacitor through the fourth diode based on a voltage provided from the driving power supply unit 3.

Meanwhile, in various embodiments, when the user device is in the second designated state, in response to identifying that the charging of the capacitor is completed, the control unit 6 may switch the state of the first signal transmitted from the control unit 6 to the state detecting unit 5 from the first state to the second state, to turn off the LED of the first photo coupler. In various embodiments, the transistor of the first photo coupler may be turned off based on the turning off the LED of the first photo coupler. In various embodiments, the anode and the cathode of the first diode may be changed to the low state based on the turn-off of the transistor of the first photo coupler. In various embodiments, the first FET of the power cut-off unit may be turned off by changing the state of the gate of the first FET to the low state, by changing the cathode of the first diode electrically connected to the gate of the first FET to the low state. In various embodiments, the power cut-off unit 2 may cut off the DC power provided to the driving power supply unit 3 based on the turn-off of the first FET.

In various embodiments, when the state detecting unit 5 includes the RF signal reception module electrically connected to the control unit 6, the state detecting unit 5 may detect whether the state of the user device is within the first designated state or within the second designated state according to whether an RF signal is received through the RF signal reception module. For example, when the state detecting unit 5 includes the RF signal reception module electrically connected to the control unit 6, the charging power unit 8 in the electronic device 1 may include a fourth diode, a capacitor, and a fifth diode. In various embodiments, the anode of the fourth diode may be electrically connected to the driving power supply unit, the cathode of the fourth diode may be electrically connected to a first terminal of the capacitor, and may be electrically connected to an anode of the fifth diode. In various embodiments, the second terminal of the capacitor may be electrically connected to the ground. In various embodiments, the cathode of the third diode may be electrically connected to each of the control unit 6 and the RF signal receiving module. In various embodiments, the capacitor may be charged based on a voltage applied through the fourth diode while the user device is in the first designated state. In various embodiments, the RF signal receiving module may maintain an active state based on a voltage of the charged capacitor while the user device is in the second designated state. In various embodiments, in response to a transition from the first designated state to the second designated state of the user device, the control unit 6 may change the state of the control unit 6 to a sleep state, change the sleep state to a wake-up state based on a designated period while the user device is in the second designated state, and identify whether the voltage level of the charged capacitor reaches less than a designated level. In various embodiments, in response to identifying that the level of the voltage of the charged capacitor reaches less than the designated level while the user device is in the second designated state, the control unit 6 may switch the state of the first signal transmitted from the control unit 6 to the state detecting unit 5 from the second state to the first state, in order to maintain the active state of the RF signal receiving module. In various embodiments, the LED of the first photo coupler may be turned on based on the first signal switched to the first state. In various embodiments, the transistor of the first photo coupler may be turned on based on the lighting of the LED of the first photo coupler. In various embodiments, the anode and the cathode of the first diode may be changed to a high state based on the turn-on of the transistor of the first photo coupler. In various embodiments, in response to the change to the high state of the anode and the cathode of the first diode, the first FET of the power cut-off unit 2 may be turned on based on a voltage applied to the gate of the first FET through the third diode in the power cut-off unit 2. In various embodiments, the power cut-off unit 2 may provide the DC power to the driving power supply unit 3 based on the turn-on of the first FET. In various embodiments, the charging power unit 8 may charge the capacitor through the fourth diode based on a voltage provided from the driving power supply unit 3.

Meanwhile, in various embodiments, when the user device is in the second designated state, in response to identifying that the charging of the capacitor is completed, the control unit 6 may switch the state of the first signal transmitted from the control unit 6 to the state detecting unit 5 from the first state to the second state in order to turn off the LED of the first photo coupler. In various embodiments, the transistor of the first photo coupler may be turned off based on the turning off the LED of the first photo coupler. In various embodiments, the anode and the cathode of the first diode may be changed to the low state based on the turn-off of the transistor of the first photo coupler. In various embodiments, the first FET of the power cut-off unit may be turned off by changing the state of the gate of the first FET to the low state, by changing the cathode of the first diode electrically connected to the gate of the first FET to the low state. In various embodiments, the power cut-off unit 2 may cut off the DC power provided to the driving power supply unit 3 based on the turn-off of the first FET.

In various embodiments, when the state detecting unit 5 includes the temperature sensor electrically connected to the control unit 6, the state detecting unit 5 may detect whether the state of the user device is within the first designated state or within the second designated state according to the sensing data received from the temperature sensor. For example, when the state detecting unit 5 includes the temperature sensor electrically connected to the control unit 6, the charging power unit 8 in the electronic device 1 may include a fourth diode, a capacitor, and a fifth diode. In various embodiments, the anode of the fourth diode may be electrically connected to the driving power unit, the cathode of the fourth diode may be electrically connected to a first terminal of the capacitor, and may be electrically connected to an anode of the fifth diode. In various embodiments, the second terminal of the capacitor may be electrically connected to the ground. In various embodiments, the cathode of the third diode may be electrically connected to each of the control unit 6 and the temperature sensor. In various embodiments, while the user device is within the first designated state, the capacitor may be charged based on a voltage applied through the fourth diode. In various embodiments, while the user device is within the second designated state, the temperature sensor may maintain an active state based on a voltage of the charged capacitor. In various embodiments, in response to a transition from the first designated state to the second designated state of the user device, the control unit 6 may switch the state of the control unit 6 to the sleep state, switch the sleep state to the wake-up state based on a designated period while the user device is in the second designated state, and may identify whether the level of the voltage of the charged capacitor reaches less than a designated level while being in the wake-up state. In various embodiments, in response to identifying that the level of the voltage of the charged capacitor reaches less than the designated level while the user device is in the second designated state, the control unit 6 may switch the state of the first signal transmitted from the control unit 6 to the state detecting unit 5 from the second state to the first state in order to maintain the active state of the temperature sensor. In various embodiments, the LED of the first photo coupler may be turned on based on the first signal switched to the first state. In various embodiments, the transistor of the first photo coupler may be turned on based on the turning on the LED of the first photo coupler. In various embodiments, the anode and the cathode of the first diode may be changed to a high state based on the turn-on of the transistor of the first photo coupler. In various embodiments, in response to a change to the high state of anode state and cathode state of the first diode, the first FET of the power cut-off unit 2 may be turned on based on a voltage applied to the gate of the first FET through the third diode in the power cut-off unit 2. In various embodiments, based on the turn-on of the first FET, the power cut-off unit 2 may provide the DC power to the driving power supply unit 3. In various embodiments, the charging power unit 8 may charge the capacitor through the fourth diode based on a voltage provided from the driving power supply unit 3.

Meanwhile, in various embodiments, when the user device is in the second designated state, in response to identifying that the charging of the capacitor is completed, the control unit 6 may switch, to turn off the LED of the first photo coupler, the state of the first signal transmitted from the control unit 6 to the state detection unit 5 from the first state to the second state. In various embodiments, the transistor of the first photo coupler may be turned off based on the turning off the LED of the first photo coupler. In various embodiments, the anode and the cathode of the first diode may be changed to the low state, based on the turn-off of the transistor of the first photo couple. In various embodiments, the first FET of the power cut-off unit may be turned off by changing the state of the gate of the first FET to the low state, by changing the cathode of the first diode electrically connected to the gate of the first FET to the low state. In various embodiments, the power cut-off unit 2 may cut off the DC power provided to the driving power supply unit 3 based on the turn-off of the first FET.

As described above, while the user device is in a turned-off state (or the second designated state), the electronic device 1 according to various embodiments may minimize waste power of the user device, by cutting off the DC power provided to the driving power supply unit 3 using the power cut-off unit 2. The electronic device 1 according to various embodiments, when the turn-off state needs to be switched to the turn-on state according to whether the user device receives an IR signal, or when the user device needs to switch the turn-off state to the turn-on state according to whether the RF signal is received, when the user device alternatively needs to switch the turn-off state to the turn-on state according to the temperature of the user device, may provide the switching by further using the charging power unit 8 in the electronic device 1. In addition, the electronic device 1 may minimize waste power of the user device requiring the switching, by including a charging power unit 8, a state detecting unit 5, a control unit 6, and a power cut-off unit 2.

In various embodiments, the electronic device 1 may be designed with various circuits.

For example, referring to FIG. 2, the electronic device 1 according to various embodiments may include a power cut-off unit 10 (e.g., the power cut-off unit 2 of FIG. 1), a driving power supply unit 20 (e.g., the driving power supply unit 3 of FIG. 1), a power conversion unit 30 (e.g., the power converter 4 of FIG. 1), a state detection unit 40 (e.g., the state detecting unit 5 of FIG. 1), a signal processing unit 50 (e.g., the signal processing unit 7 of FIG. 1), and the control unit 60 (e.g., the control unit 6 of FIG. 1) may be included.

In various embodiments, while the state of the user device is within the second designated state, external power (e.g., AC power) may be converted into DC power by the power conversion unit 30. The DC power is changed to a low voltage in a distribution circuit composed of resistance R1 and resistance R2, and the DC power changed to the low voltage may be applied to the node E of the switch SW. For example, when the resistors R1 are 200 (MΩ), the resistors R2 and R3 are 10 (MΩ), and the DC voltage is 310 (V), a DC voltage of about 15 (V) may be applied to the node E. Meanwhile, in the above-described example, the current applied to the node E may be about 1.5 (μA). Thus, while the user device is in the second designated state, the waste power of the user device may be about 450 (μW) close to 0 (W).

In various embodiments, when the state of the switch SW is switched from an open state to a closed state in order to switch the state of the user device from the second designated state to the first designated state, the DC voltage applied to the node E may be applied to the node F. The DC voltage applied to the node F may be applied to the gate of the FET Q1 of the power cut-off unit 10 through the diode D1. With the application, the FET Q1 is turned on, and DC power may be provided from node C to node D based on the turn-on. Meanwhile, the driving power supply unit 20 may generate driving power of the user device based on the DC power.

Meanwhile, when the power VC is provided from the driving power supply unit 20 to the control unit 60, the MICOM U1 of the control unit 60 may be switched to an active state. The MICOM U1 of the control unit 60 may switch the state of the signal provided to the state detecting unit 40 to the low state through the output terminal O1 in response to the conversion to the active state. Based on the signal in the low state, the LED of the photo coupler U3 in the state detection unit 40 may be turned on. Based on the turning on the LED of the photo coupler U3, the transistor of the photo coupler U3 may be turned on. A voltage applied to the resistor R4 based on the turn-on of the transistor of the photo coupler U3 may have a high state, the voltage applied to the R4 may be applied to the gate of the FET Q1 in the power cut-off unit 10 through the diode D2. By the voltage applied to the gate of the FET Q1, the FET Q1 may maintain a turned-on state even when the switch SW is switched to an open state, and the DC power supplied to the driving power supply unit 20 may be maintained.

In various embodiments, when the switch SW is physically depressed to switch the state of the user device from the first designated state to the second designated state, based on the electrical connection between node E and node F through the diode D3, the voltage applied to the node E may be applied to the gate of the FET Q2. Based on the voltage applied to the gate of the FET Q2, the FET Q2 may be turned on. Based on the turn-on of the FET Q2, the LED of the photo coupler U2 may be turned on. Based on the lighting of the LED of the photo coupler U2, the transistor of the photo coupler U2 may be turned on, based on the turn-on of the transistor of the photo coupler U2, the state of the signal transmitted from the signal processing unit 50 to the input terminal I1 of the MICOM U1 of the controller 60 may be switched from the high state to the low state. Based on the signal in the low state, the state of the signal transmitted from the control unit 60 to the state detection unit 40 through the output terminal O1 of the MICOM U1 may be switched from the low state to the high state. Based on the signal converted to the high state, the LED of the photo coupler U3 of the state detection unit 40 may be turned off. The transistor of the photo coupler U3 may be turned off based on the light of the LED of the photo coupler U3. Based on the turn-off of the transistor of the photo coupler U3, the current applied to the resistor R4 may be cut off, and the anode and cathode of the diode D2 may be switched to a low state. The gate of the FET Q1 of the power supply cut-off unit 10 is switched to the low state based on the switching of the cathode to the low state of the diode D2, the FET Q1 may be turned off based on the gate of the FET Q1 switched to the low state. Based on the turn-off of the FET Q1, the power cut-off unit 10 may cut off the DC power provided to the driving power supply unit 20. In other words, the power cut-off unit 10 may cut off waste power of the user device by using the turn off of the FET Q1.

In various embodiments, when the controller 60 receives a control completion signal (e.g., when the user device is a washing machine, a signal for instructing completion of a washing course) from the user device in order to switch the state of the user device from the first designated state to the second designated state, the MICOM U1 may switch a state of a signal transmitted to the state detection unit 40 to a high state through the output terminal O1. Based on the signal converted to the high state, the LED of the photo coupler U3 may be turned off. The transistor of the photo coupler U3 may be turned off based on the turning off the LED of the photo coupler U3. Based on the turn-off of the transistor of the photo coupler U3, current applied to the resistor R4 may be blocked, and the anode and the cathode of the diode D2 may have a low state. Based on the row state of the cathode of the diode D2, the gate of the FET Q1 may be switched to the row state. The FET Q1 may be turned off based on the low state of the gate of the FET Q1. Based on the turn-off of the FET Q1, the power cut-off unit 10 may cut off the DC power provided to the driving power supply unit 20. In other words, the power cut-off unit 10 may cut off waste power of the user device by using the turnoff of the FET Q1.

For another example, referring to FIG. 3, the electronic device 1 according to various embodiments may include a power cut-off unit 100 (e.g., the power cut-off unit 2 of FIG. 1), a driving power supply unit 200 (e.g., the driving power supply unit 3 of FIG. 1), a power conversion unit 300 (e.g., the power converter 4 of FIG. 1), a state detecting unit 400 (e.g., the state detecting unit 5 of FIG. 1), a charging power supply unit 500 (e.g., the charging power unit 8 of FIG. 1), and the control unit 600 (e.g., the control unit 6 of FIG. 1). In various embodiments, the state detecting unit 400 may further include a touch switch circuit 710 (or a tact switch circuit 710), an IR signal reception module 720, an RF signal reception module 730, or a temperature sensor 740. FIG. 3 illustrates an example in which the state detecting unit 400 includes the temperature sensor 740, but this is only for convenience of explanation, and various sensors can be included in the state detection unit 400.

In various embodiments, when the user device is used for the first time after opening or power (e.g., AC power) is supplied from the outside while the capacitor C6 of the charging power supply unit 500 is completely discharged, the power converter 300 may provide the DC power converted from the power source to the state detecting unit 400 by performing rectification of the power source using a diode bridge BR2 and a capacitor C7. The DC power applied to the state detection unit 400 is applied to the resistors R6 and R8 to be converted into a low voltage, the converted voltage may charge the capacitor C4. The voltage applied to the base of the transistor Q4 may be increased based on the charging of the capacitor C4. Based on the increase in the voltage applied to the base of the transistor Q4, the transistor Q4 is turned on, the potential of the transistor Q4 may be switched to a low state by the turn-on of the transistor Q4.

Meanwhile, before the transistor Q4 is turned on, a high-state signal may be applied to the power cutoff unit 100 through the resistor R7. The signal in the high state may be applied to the gate of the FET Q3 of the power cut-off unit 100 through the diode D4. Based on the signal in the high state applied to the gate of the FET Q3, the FET Q3 may be turned on. By applying a current from the node CC to the node DD based on the turn-on of the FET Q3, the power cut-off unit 100 may provide power for driving the user device to the driving power supply unit 200.

Meanwhile, when power for driving the user device is provided from the driving power supply unit 200, MICOM U3 of the control unit 600 may switch a state of a signal provided to the photo coupler U4 to a low state through the output terminal O1. The transistor of the photo coupler U4 may be turned on based on the signal converted to the low state. Based on the turn-on of the transistor of the photo coupler U4, a high-state voltage may be applied to the resistor R9 and the capacitor C5. The voltage in the high state may be applied to the gate of the FET Q3 through the diode D7. Based on the voltage applied to the gate of the FET Q3, the FET Q3 may maintain a turned-on state even when the transistor Q4 is turned off. Based on the maintenance of the turn-on state, the supply of power from the driving power supply unit 200 to the user device may be maintained.

Meanwhile, in various embodiments, while power is supplied from the driving power supply unit 200 to the user device (or while the user device is within the first designated state), the super capacitor C6 in the charging power supply unit 500 may be charged based on a voltage applied through the diode D5 in the charging power supply unit 500.

Meanwhile, while the user device is within the second designated area, the charged super capacitor C6 may provide a voltage VS to the MICOM U in the controller 600, the touch switch circuit 710 (or a tact switch circuit 710) in the state detection unit 400, IR signal reception module 720, RF signal reception module 730, or temperature sensor 740 through the diode D6. By waking up based on the specified period, the MICOM U3 acquiring the voltage VS may obtain information on a state of a level of the voltage VS provided from the charging power supply unit 500 through the resistor R11 and the resistor R12. MICOM U3 may identify whether the level of the voltage VS reaches less than (or below) a designated level based on the information obtained through the input terminal I3. Based on identifying that the level of the voltage VS reaches less than (or below) the designated level, the MICOM U3 may switch a state of a signal transmitted to the state detection unit 400 to a low state through the output terminal O1 of the MICOM U3. The transistor of the photo coupler U4 may be turned on based on the signal converted to the low state. The gate of FET Q3 may receive a high-state signal through the diode D7 based on the turn-on of the transistor of the photo coupler U4. In response to reception of the signal in the high state of the gate of the FET Q3, the FET Q3 may be turned on. Meanwhile, the driving power supply unit 200 may obtain power based on the turn-on of the FET Q3.

In various embodiments, while the user device is within the first designated state, The MICOM U3 may receive a signal from the touch switch circuit 710 (or the tact switch circuit 710, the IR signal receiving module 720, the RF signal receiving module 730, or the temperature sensor 740 indicating that the state of the user device is switched to the second designated state. In response to the reception of the signal, the MICOM U3 may turn off the FET Q3 of the power cut-off unit 100 by switching the state of the signal transmitted to the state detection unit 400 through the output O1.

Meanwhile, while the power provided to the user device is cut off or while the user device is in the second designated state, the MICOM U3 may monitor the level of the voltage VS through I3. Based on identifying that the level of the voltage VS is above (or above) the designated level, the MICOM U3 may switch the state of the signal transmitted to the state detecting unit 400 to the high state through the output terminal O1 of the MICOM U3. Based on the signal converted to the high state, the LED of the photo coupler U4 may be turned off. The transistor of the photo coupler U4 may be turned off based on the turning off the LED of the photo coupler U4. The gate of the FET Q3 may be switched to a low state based on the turn-off of the transistor of the photo coupler U4. Based on the conversion of the gate of the FET Q3 to the low state, the FET Q3 is turned off, and power provided to the driving power supply unit 200 may be cut off.

Meanwhile, by periodically switching the sleep state to the wake-up state, the MICOM U3 may identify whether the level of the voltage VS is less than (or below) the designated level. When identifying that the level of the voltage VS is greater than or equal to the designated level, the state of the microcomputer U3 may be switched to the sleep state again. Meanwhile, when identifying that the level of the voltage VS is less than (or below) the designated level, the MICOM U3 may perform an operation for charging the super capacitor C6 in the charging power supply unit 500.

As described above, when the turn-off state needs to be switched to the turn-on state according to whether the user device receives an IR signal, and alternatively, when the user device needs to switch the turn-off state to the turn-on state according to the temperature of the user device, the user device needs to switch the turn-off state to the turn-on state according to whether the RF signal is received, the electronic device 1 according to various embodiments may provide the switching by further using the charging power supply unit 500 in the electronic device 1. In addition, the electronic device 1 may include a charging power unit 500, a state detecting unit 400, a control unit 600, and a power cut-off unit 100, thereby minimizing wasted power of the user device requiring the switching.

An electronic device according to various embodiments may comprise a power converter configured to generate DC(direct current) power based on power obtained from outside, a state detecting unit, comprising a first photo coupler and a first diode electrically connected with the first photo coupler, configured to detect a state of a user device that comprises the electronic device or is electrically connected with the electronic device, a driving power supply unit configured to supply driving power for the user device based on the DC power, a power cut-off unit, comprising a first field effect transistor (FET), configured to cut off the DC power provided to the driving power supply unit according to the state of the user device, a control unit electrically connected with the state detecting unit; wherein the control unit is configured to in response to detecting, by the state detecting unit, the state of the user device is switched from a first designated state requiring application of the driving power to a second designated state requiring cut-off of the driving power, switch a state of a first signal from a first state to a second state to turn off a light emitting diode (LED) of the first photo coupler; wherein a transistor of the first photo coupler is turned off based on turning off the LED of the first photo coupler; wherein an anode and a cathode of first diode is changed to a low state based on the turning-off of the transistor of the first photo coupler; wherein the first FET of the power cut-off unit is turned off by changing a state of a gate of the first FET to a low state by changing the cathode of the first diode connected with the gate of the first FET to the low state; wherein the power cut-off unit is configured to cut off the DC power provided to the driving power supply unit based on the turning-off of the first FET.

According to various embodiment, the electronic device may be configured to comprise furthermore; a signal processing unit comprising a second FET, a second diode that is electrically connected with the state detecting unit and is electrically connected with a gate of the second FET, and a second photo coupler electrically connected with a drain of the second FET; wherein the second FET is turned on in response to receiving by using the gate of the second FET, from the state detecting unit through the second diode, a second signal for indicating that the state of the user device is switched from the first designated state to the second designated state; wherein a LED of the second photo coupler is turned on based on turning on the second FET; wherein a transistor of the second photo coupler is turned on based on turning on the LED of the second photo coupler; wherein a state of a third signal transmitted from the signal processing unit to the control unit is switched from a first state to a second state based on turning on the transistor of the second photo coupler, and; wherein the control unit is configured to switch, in response to the third signal switched from the first state to the second state, the state of the first signal from the first state to the second state.

According to various embodiment, the power cut-off unit may be configured to comprise furthermore; a third diode connected with the gate of the first FET, first FET of the power cut-off unit is, while the user device is in the first designated state, turned on, based on a voltage applied to the gate of the first FET through the third diode, and the power cut-off unit is configured to provide the DC power to the driving power supply unit based on turning on the first FET.

According to various embodiment, the power converter may comprise a bridge diode for converting the power from outside to the DC power and a capacitor.

According to various embodiment, the state detecting unit may comprise a switch of the user device at least partially exposed to outside, and; wherein the state detecting unit is configured to detect, based on a state of the switch of the user device, whether the state of the user device is the first designated state or the second designated state.

According to various embodiment, the state detecting unit further comprises a IR (infrared) signal reception module electrically connected with the control unit, and; wherein the state detecting unit is configured to detect, according to whether receiving through the IR signal reception module an IR signal or not, whether the state of the user device is the first designated state of the second designated state. According to various embodiment, the electronic device may be configured to comprise furthermore a charging power unit comprising a second diode, a capacitor, and a third diode; wherein an anode of the second diode is electrically connected with the driving power supply unit; wherein a cathode of the second diode is electrically connected with a first terminal of the capacitor and is electrically connected with an anode of the third diode; wherein a second terminal of the capacitor is electrically connected with a ground; wherein a cathode of the third diode is electrically connected with each of the control unit and the IR signal reception module; wherein the capacitor is charged based on a voltage applied through the second diode while the user device is in the first designated state; wherein the IR signal reception module maintains an activate state based on a voltage of the charged capacitor, while the user device is in the second designated state, and; wherein the control unit is configured to switch a state of the control unit to a sleep state, in response to switching from the first designated state to the second designated state of the user device; switch the sleep state to a wake-up state while the user device is in the second designated state; and identify, while the control unit is in the wake-up state, a level of the voltage of the charged capacitor reaches below a designated level.

According to various embodiment, the control unit may be configured to comprise furthermore; switch, in response to identifying that the level of the voltage of the charged capacitor reaches below the designated level while the user device is in the second designated state, the state of the first signal that is transmitted from the control unit to the state detecting unit from the second state to the first state to maintain the activate state of the IR signal reception module; wherein the LED of the first photo coupler is turned on based on the first signal switched to the first state; wherein the transistor of the first photo coupler is turned on based on turning on the LED of the first photo coupler; wherein the anode and the cathode of the first diode are changed to a high state based on turning on the transistor of the first photo coupler; wherein the first FET of the power cut-off unit is, in response to changing to the high state of the anode and the cathode of the first diode, turned on based on a voltage applied to the gate of the first FET through a fourth diode that is further included in the power cut-off unit and is connected with the gate of the first FET; wherein the power cut-off unit is configured to provide, to the driving power supply unit, the DC power based on turning on the first FET, and; wherein the charging power unit is configured to charge the capacitor through the second diode based on a voltage provided from the driving power supply unit.

According to various embodiment, the state detecting unit may be configured to comprise furthermore; a radio frequency (RF) signal reception module electrically connected with the control unit; wherein the state detecting unit is configured to detect, according to whether receiving through the IR signal reception module a RF signal or not, whether the state of the user device is the first designated state or the second designated state.

According to various embodiment, the electronic devise may be configured to comprise furthermore; a charging power unit comprising a second diode, a capacitor, and a third diode; wherein an anode of the second diode is electrically connected with the driving power supply unit; wherein a cathode of the second diode is electrically connected with a first terminal of the capacitor and is electrically connected with an anode of the third diode; wherein a second terminal of the capacitor is electrically connected with a ground; wherein a cathode of the third diode is electrically connected with each of the control unit and the RF signal reception module; wherein the capacitor is charged based on a voltage applied through the second diode while the user device is in the first designated state; wherein the RF signal reception module maintains an activate state based on a voltage of the charged capacitor, while the user device is in the second designated state, and; wherein the control unit may be configured to switch a state of the control unit to a sleep state, in response to switching from the first designated state to the second designated state of the user device; switch the sleep state to a wake-up state while the user device is in the second designated state; and identify, while the control unit is in the wake-up state, a level of the voltage of the charged capacitor reaches below a designated level.

According to various embodiment, the control unit may be configured to comprise furthermore; switch, in response to identifying that the level of the voltage of the charged capacitor reaches below the designated level while the user device is in the second designated state, the state of the first signal that is transmitted from the control unit to the state detecting unit from the second state to the first state to maintain the activate state of the RF signal reception module; wherein the LED of the first photo coupler is turned on based on the first signal switched to the first state; wherein the transistor of the first photo coupler is turned on based on turning on the LED of the first photo coupler; wherein the anode and the cathode of the first diode are changed to a high state based on turning on the transistor of the first photo coupler; wherein the first FET of the power cut-off unit is, in response to changing to the high state of the anode and the cathode of the first diode, turned on based on a voltage applied to the gate of the first FET through a fourth diode that is further included in the power cut-off unit and is connected with the gate of the first FET, wherein the power cut-off unit is configured to provide, to the driving power supply unit, the DC power based on turning on the first FET, and wherein the charging power unit is configured to charge the capacitor through the second diode based on a voltage provided from the driving power supply unit.

According to various embodiment, the state detecting unit may be configured to comprise furthermore a temperature sensor electrically connected with the control unit; wherein the state detecting unit is configured to detect, according to sensing data received from the temperature sensor, whether the state of the user device is the first designated state or the second designated state. According to various embodiment, the electronic devise may be configured to comprise furthermore a second diode, a capacitor, and a third diode; wherein an anode of the second diode is electrically connected with the driving power supply unit; wherein a cathode of the second diode is electrically connected with a first terminal of the capacitor and is electrically connected with an anode of the third diode; wherein a second terminal of the capacitor is electrically connected with a ground; wherein a cathode of the third diode is electrically connected with each of the control unit and the temperature sensor; wherein the capacitor is charged based on a voltage applied through the second diode while the user device is in the first designated state; wherein the temperature sensor maintains an activate state based on a voltage of the charged capacitor, while the user device is in the second designated state, and wherein the control unit is configured to switch a state of the control unit to a sleep state, in response to switching from the first designated state to the second designated state; switch the sleep state to a wake-up state based on designated cycle while the user device is in the second designated state; and identify, while the control unit is in the wake-up state, a level of the voltage of the charged capacitor reaches below a designated level. According to various embodiment, the control unit may be configured to comprise furthermore; switch, in response to identifying that the level of the voltage of the charged capacitor reaches below the designated level while the user device is in the second designated state, the state of the first signal that is transmitted from the control unit to the state detecting unit to maintain the activate state of the temperature sensor, from the second state to the first state; wherein the LED of the first photo coupler is turned on based on the first signal switched to the first state; wherein the transistor of the first photo coupler is turned on based on turning on the LED of the first photo coupler; wherein the anode and the cathode of the first diode are changed to a high state based on turning on the transistor of the first photo coupler; wherein the first FET of the power cut-off unit is, in response to changing to the high state of the anode and the cathode of the first diode, turned on based on a voltage applied to the gate of the first FET through a fourth diode that is further included in the power cut-off unit and is connected with the gate of the first FET; wherein the power cut-off unit is configured to provide, to the driving power supply unit, the DC power based on turning on the first FET, and wherein the charging power unit is configured to charge the capacitor through the second diode based on a voltage provided from the driving power supply unit. According to various embodiment, the control unit may be configured to comprise furthermore; if the user device is in the second designated state, in response to identifying to complete the charging of the capacitor, switch the state of the first signal transmitted from the control unit to the state detecting unit from the first state to the second state to turn off the LED of the first photo coupler; wherein the transistor of the first photo coupler is turned off based on turning off the LED of the first photo coupler; wherein the anode and the cathode of the first diode are changed to the low state based on turning off the transistor of the first photo coupler; wherein the first FET of the power cut-off unit is turned off by changing the state of the gate of the first FET to the low state by changing the cathode of the first diode connected with the gate of the first FET to the low state; wherein the power cut-off unit is further configured to cut off the DC power provided to the driving power supply unit based on turning off the first FET.

In specific embodiments of the present disclosure described above, the components included in the disclosure have been expressed in a single or plural number according to the specific embodiments presented. However, singular or plural expressions are selected appropriately for the situation presented for convenience of explanation, and the present disclosure is not limited to singular or plural components and even if it is a component expressed in plural, it may consist of a single number, or even if it is a component expressed in a single number, it may consist of a plurality. Meanwhile, detailed embodiments have been described in the detailed description of the present disclosure, but it goes without saying that various modifications are possible within the limit not departing from the scope of the present disclosure. Therefore, the scope of the present disclosure should not be limited to the described embodiments, but should be determined by the scope of the patent claim to be described later as well as those equivalent to the scope of the patent claim.

The invention claimed is:

1. An electronic device comprising:
    a power converter configured to generate DC (direct current) power based on power obtained from outside;
    a state detecting unit, comprising a first photo coupler and a first diode electrically connected with the first photo coupler, configured to detect a state of a user device that comprises the electronic device or is electrically connected with the electronic device;

a driving power supply unit configured to supply driving power for the user device based on the DC power;
a power cut-off unit, comprising a first field effect transistor (FET), configured to cut off the DC power provided to the driving power supply unit according to the state of the user device; and
a control unit electrically connected with the state detecting unit,
wherein the control unit is configured to:
in response to detecting, by the state detecting unit, the state of the user device is switched from a first designated state requiring application of the driving power to a second designated state requiring cut-off of the driving power, switch a state of a first signal from a first state to a second state to turn off a light emitting diode (LED) of the first photo coupler,
wherein a transistor of the first photo coupler is turned off based on turning off the LED of the first photo coupler,
wherein an anode and a cathode of the first diode is changed to a low state based on the turning-off of the transistor of the first photo coupler,
wherein the first FET of the power cut-off unit is turned off by changing a state of a gate of the first FET to a low state by changing the cathode of the first diode connected with the gate of the first FET to the low state, and
wherein the power cut-off unit is configured to cut off the DC power provided to the driving power supply unit based on the turning-off of the first FET.

2. The electronic device of claim 1, further comprising:
a signal processing unit comprising a second FET, a second diode that is electrically connected with the state detecting unit and is electrically connected with a gate of the second FET, and a second photo coupler electrically connected with a drain of the second FET,
wherein the second FET is turned on in response to receiving by using the gate of the second FET, from the state detecting unit through the second diode, a second signal for indicating that the state of the user device is switched from the first designated state to the second designated state,
wherein a LED of the second photo coupler is turned on based on turning on the second FET,
wherein a transistor of the second photo coupler is turned on based on turning on the LED of the second photo coupler,
wherein a state of a third signal transmitted from the signal processing unit to the control unit is switched from a first state to a second state based on turning on the transistor of the second photo coupler, and
wherein the control unit is configured to switch, in response to the third signal switched from the first state to the second state, the state of the first signal from the first state to the second state.

3. The electronic device of claim 2, wherein the power cut-off unit further comprises a third diode connected with the gate of the first FET,
wherein the first FET of the power cut-off unit is, while the user device is in the first designated state, turned on, based on a voltage applied to the gate of the first FET through the third diode, and
wherein the power cut-off unit is configured to provide the DC power to the driving power supply unit based on turning on the first FET.

4. The electronic device of claim 1, wherein the power converter comprises a bridge diode for converting the power from outside to the DC power and a capacitor.

5. The electronic device of claim 1, wherein the state detecting unit comprises a switch of the user device at least partially exposed to outside, and
wherein the state detecting unit is configured to detect, based on a state of the switch of the user device, whether the state of the user device is the first designated state or the second designated state.

6. The electronic device of claim 1, wherein the state detecting unit further comprises a IR (infrared) signal reception module electrically connected with the control unit, and
wherein the state detecting unit is configured to detect, according to whether receiving through the IR signal reception module an IR signal or not, whether the state of the user device is the first designated state of the second designated state.

7. The electronic device of claim 6, further comprising:
a charging power unit comprising a second diode, a capacitor, and a third diode,
wherein an anode of the second diode is electrically connected with the driving power supply unit,
wherein a cathode of the second diode is electrically connected with a first terminal of the capacitor and is electrically connected with an anode of the third diode,
wherein a second terminal of the capacitor is electrically connected with a ground,
wherein a cathode of the third diode is electrically connected with each of the control unit and the IR signal reception module,
wherein the capacitor is charged based on a voltage applied through the second diode while the user device is in the first designated state,
wherein the IR signal reception module maintains an activate state based on a voltage of the charged capacitor, while the user device is in the second designated state, and
wherein the control unit is configured to:
switch a state of the control unit to a sleep state, in response to switching from the first designated state to the second designated state of the user device;
switch, based on a designated period, the sleep state to a wake-up state while the user device is in the second designated state; and
identify, while the control unit is in the wake-up state, a level of the voltage of the charged capacitor reaches below a designated level.

8. The electronic device of claim 7, wherein the control unit is configured to:
switch, in response to identifying that the level of the voltage of the charged capacitor reaches below the designated level while the user device is in the second designated state, the state of the first signal that is transmitted from the control unit to the state detecting unit from the second state to the first state to maintain the activate state of the IR signal reception module,
wherein the LED of the first photo coupler is turned on based on the first signal switched to the first state,
wherein the transistor of the first photo coupler is turned on based on turning on the LED of the first photo coupler,
wherein the anode and the cathode of the first diode are changed to a high state based on turning on the transistor of the first photo coupler,
wherein the first FET of the power cut-off unit is, in response to changing to the high state of the anode and the cathode of the first diode, turned on based on a voltage applied to the gate of the first FET through a fourth diode that is further included in the power cut-off unit and is connected with the gate of the first FET, wherein the power cut-off unit is configured to provide, to the driving power supply unit, the DC power based on turning on the first FET, and wherein the charging power unit is configured to charge the capacitor through the second diode based on a voltage provided from the driving power supply unit.

9. The electronic device of claim 1, wherein the state detecting unit further comprises a radio frequency (RF) signal reception module electrically connected with the control unit, wherein the state detecting unit is configured to detect, according to whether receiving through the IR signal reception module a RF signal or not, whether the state of the user device is the first designated state or the second designated state.

10. The electronic device of claim 9, further comprising:

a charging power unit comprising a second diode, a capacitor, and a third diode, wherein an anode of the second diode is electrically connected with the driving power supply unit, wherein a cathode of the second diode is electrically connected with a first terminal of the capacitor and is electrically connected with an anode of the third diode, wherein a second terminal of the capacitor is electrically connected with a ground, wherein a cathode of the third diode is electrically connected with each of the control unit and the RF signal reception module, wherein the capacitor is charged based on a voltage applied through the second diode while the user device is in the first designated state, wherein the RF signal reception module maintains an activate state based on a voltage of the charged capacitor, while the user device is in the second designated state, and wherein the control unit is configured to:

switch a state of the control unit to a sleep state, in response to switching from the first designated state to the second designated state of the user device;

switch the sleep state to a wake-up state while the user device is in the second designated state; and identify, while the control unit is in the wake-up state, a level of the voltage of the charged capacitor reaches below a designated level.

11. The electronic device of claim 10, wherein the control unit is configured to:

switch, in response to identifying that the level of the voltage of the charged capacitor reaches below the designated level while the user device is in the second designated state, the state of the first signal that is transmitted from the control unit to the state detecting unit from the second state to the first state to maintain the activate state of the RF signal reception module, wherein the LED of the first photo coupler is turned on based on the first signal switched to the first state, wherein the transistor of the first photo coupler is turned on based on turning on the LED of the first photo coupler, wherein the anode and the cathode of the first diode are changed to a high state based on turning on the transistor of the first photo coupler, wherein the first FET of the power cut-off unit is, in response to changing to the high state of the anode and the cathode of the first diode, turned on based on a voltage applied to the gate of the first FET through a fourth diode that is further included in the power cut-off unit and is connected with the gate of the first FET, wherein the power cut-off unit is configured to provide, to the driving power supply unit, the DC power based on turning on the first FET, and wherein the charging power unit is configured to charge the capacitor through the second diode based on a voltage provided from the driving power supply unit.

12. The electronic device of claim 1, wherein the state detecting unit further comprises a temperature sensor electrically connected with the control unit, wherein the state detecting unit is configured to detect, according to sensing data received from the temperature sensor, whether the state of the user device is the first designated state or the second designated state.

13. The electronic device of claim 12, further comprising:

a charging power unit comprising a second diode, a capacitor, and a third diode, wherein an anode of the second diode is electrically connected with the driving power supply unit, wherein a cathode of the second diode is electrically connected with a first terminal of the capacitor and is electrically connected with an anode of the third diode, wherein a second terminal of the capacitor is electrically connected with a ground, wherein a cathode of the third diode is electrically connected with each of the control unit and the temperature sensor, wherein the capacitor is charged based on a voltage applied through the second diode while the user device is in the first designated state, wherein the temperature sensor maintains an activate state based on a voltage of the charged capacitor, while the user device is in the second designated state, and wherein the control unit is configured to:

switch a state of the control unit to a sleep state, in response to switching from the first designated state to the second designated state;

switch the sleep state to a wake-up state based on designated cycle while the user device is in the second designated state; and identify, while the control unit is in the wake-up state, a level of the voltage of the charged capacitor reaches below a designated level.

14. The electronic device of claim 13, wherein the control unit is configured to:

switch, in response to identifying that the level of the voltage of the charged capacitor reaches below the designated level while the user device is in the second designated state, the state of the first signal that is transmitted from the control unit to the state detecting unit to maintain the activate state of the temperature sensor, from the second state to the first state, wherein the LED of the first photo coupler is turned on based on the first signal switched to the first state, wherein the transistor of the first photo coupler is turned on based on turning on the LED of the first photo coupler, wherein the anode and the cathode of the first diode are changed to a high state based on turning on the transistor of the first photo coupler, wherein the first FET of the power cut-off unit is, in response to changing to the high state of the anode and the cathode of the first diode, turned on based on a voltage applied to the gate of the first FET through a fourth diode that is further included in the power cut-off unit and is connected with the gate of the first FET, wherein the power cut-off unit is configured to provide, to the driving power supply unit, the DC power based on turning on the first FET, and wherein the charging power unit is configured to charge the capacitor through the second diode based on a voltage provided from the driving power supply unit.

15. The electronic device of claim 14, wherein the control unit is configured to:

if the user device is in the second designated state, in response to identifying to complete the charging of the capacitor, switch the state of the first signal transmitted from the control unit to the state detecting unit from the first state to the second state to turn off the LED of the first photo coupler, wherein the transistor of the first photo coupler is turned off based on turning off the LED of the first photo coupler, wherein the anode and the cathode of the first diode are changed to the low state based on turning off the transistor of the first photo coupler, wherein the first FET of the power cut-off unit is turned off by changing the state of the gate of the first FET to the low state by changing the cathode of the first diode connected with the gate of the first FET to the low state, wherein the power cut-off unit is further configured to cut off the DC power provided to the driving power supply unit based on turning off the first FET.

* * * * *